US007849002B2

(12) United States Patent
Gaubatz et al.

(10) Patent No.: US 7,849,002 B2
(45) Date of Patent: *Dec. 7, 2010

(54) SYSTEM AND METHOD FOR EVALUATING PREFERRED RISK DEFINITIONS

(75) Inventors: Dieter S. Gaubatz, Fort Wayne, IN (US); Edward J. Wright, Fort Wayne, IN (US); Tracy A. Choka, Fort Wayne, IN (US); James P. Eubank, Fort Wayne, IN (US)

(73) Assignee: Swiss Reinsurance Company, Zuerich (CH)

( * ) Notice: Subject to any disclaimer, the term of this patent is extended or adjusted under 35 U.S.C. 154(b) by 1659 days.

This patent is subject to a terminal disclaimer.

(21) Appl. No.: 10/816,120

(22) Filed: Apr. 1, 2004

(65) Prior Publication Data

US 2005/0240514 A1    Oct. 27, 2005

(51) Int. Cl.
    *G06Q 40/00* (2006.01)
(52) U.S. Cl. .......................... 705/38; 705/35
(58) Field of Classification Search ............... 705/35
    See application file for complete search history.

(56) References Cited

U.S. PATENT DOCUMENTS

| 4,975,840 | A  | * | 12/1990 | DeTore et al. ............... 705/4 |
| 6,269,339 | B1 | * | 7/2001 | Silver ............................ 705/2 |
| 6,456,979 | B1 | * | 9/2002 | Flagg ............................. 705/4 |
| 6,576,471 | B2 | * | 6/2003 | Otvos ........................... 436/71 |
| 2003/0023543 | A1 | * | 1/2003 | Gunewardena et al. ........ 705/38 |
| 2003/0101132 | A1 | * | 5/2003 | Gaubatz et al. ............... 705/38 |
| 2003/0236685 | A1 | * | 12/2003 | Buckner et al. ................ 705/4 |
| 2004/0024620 | A1 | * | 2/2004 | Robertson et al. ............. 705/4 |
| 2004/0225587 | A1 | * | 11/2004 | Messmer et al. .............. 705/35 |
| 2005/0262014 | A1 | * | 11/2005 | Fickes ........................ 705/38 |
| 2008/0091490 | A1 | * | 4/2008 | Abrahams et al. ............. 705/7 |

OTHER PUBLICATIONS

Moller et al., Occurrence of different cancers in patients with Parkinson's disease, BMJ 1995;310:1500-1501 (Jun. 10), pp. 1-3.*
Millet et al.: Modeling risk and uncertainty with the analytical hierarchy process, 2002, Joyrnal of Multi-Criteria Decision Analysis, 11 pp. 97-102.*
Crawford et al.: What's the Risk? It's all Relative, Net Wellness Consumer Health Information, University of Cincinnati /The Ohio State University/Case WesternReserve University, Feb. 2010, pp. 1-5.*

* cited by examiner

*Primary Examiner*—Hani M. Kazimi
*Assistant Examiner*—Bijendra K Shrestha
(74) *Attorney, Agent, or Firm*—Oblon, Spivak, McClelland, Maier & Neustadt, L.L.P.

(57) ABSTRACT

A method of characterizing relative risks associated with a plurality of financial products comprises the steps of identifying one or more risk classes associated with the products, determining for each risk class an expected occurrence rate, dividing the expected occurrence rates by an average rate to determine relative risk ratios, and comparing the relative risk ratios to characterize the relative risks associated with the products. In certain embodiments, one or more of the risk classes are associated with one or more criteria. The criteria may be modified and the method repeated to determine an impact of the modification on the relative risks associated with the products. The relative risk ratio may be used to redefine one or more of the risk classes. Certain embodiments may include the step of determining a separate relative risk ratio for subgroups of risks. Others may include the step of using the relative risk ratio to determine an impact on the risk class of including in that class one or more risks that do not meet one or more of the criteria associated with that class.

20 Claims, 4 Drawing Sheets

SYSTEM AND METHOD FOR EVALUATING PREFERRED RISK DEFINITIONS

TECHNICAL FIELD

This invention relates generally to risk management and, more particularly to methods and systems for characterizing relative risks based on a plurality of preferred risk criteria. The invention may be used in connection with the design, development and/or pricing of financial products, including (but not necessarily limited to) insurance products.

BACKGROUND AND SUMMARY

One aspect of risk management typically involves consideration of one or more criteria which are correlated to an event or events of interest. The ability to predict the frequency or eventual likelihood of occurrence of events of interest has value and utility in many settings.

It is often the case that different entities may use different sets of criteria to predict the expected occurrence of the same (or similar) events. In some cases, the same entity may also use different criteria sets in differing situations or differing times. Methods and systems for comparing different criteria sets are useful tools in the selection of criteria and the design and development of related products.

These considerations are applicable in the marketplace for financial products and services. This is particularly true in the field of insurance. The following discussion deals particularly with applications of such methods and systems in the field of life insurance. However, in its broader aspects, the methods and systems disclosed are applicable to other types of insurance, and to other financial products which involve risk management (e.g., pricing and evaluation of different sets of criteria that might be used in the design and development of property insurance, mortgages, credit, securities, etc.).

Life (and health) insurance products are continuously evolving. A relatively recent trend in the field of life insurance has been the increased emergence of "preferred" products. These are products regarding which the mortality expectations are lower than the expectations for "standard lives" (i.e., the average mortality expectations for a healthy population). Insurance companies provide preferred products to those individuals and/or groups which can meet selected criteria considered indicative of low mortality.

As noted, it is not uncommon for different entities (i.e., insurance companies) to use different criteria sets to identify those available for preferred coverages, and/or different cut-points for designating the levels of one or more criteria associated with preferred mortality. Thus, comparing the products from competing companies, or designing new preferred products to replace or augment existing products, can be difficult without use of a methodology which takes such differences into account. Such comparisons may be especially useful in the selection of criteria and pricing of related products, and in determining the impact of criteria changes or granting various exceptions to criteria on pricing and potential profitability of such products.

In its broader aspects, certain embodiments of the present invention are directed to computerized methods and systems of characterizing relative risks, such as mortality risks, for a plurality of financial products, such as preferred insurance products. One or more of these embodiments may include the steps of identifying one or more risk classes associated with the plurality of products; determining for each of the risk classes an expected occurrence rate; dividing the expected rates by an average rate for standard risks to determine a relative risk ratio for each of the risk classes; and comparing the relative risk ratios to characterize the relative risks associated with the plurality of products.

Additional aspects and features will become apparent to those skilled in the art upon consideration of the following detailed description of the illustrated embodiments exemplifying the best mode of carrying out the invention as presently perceived, and the claims which follow the detailed description.

BRIEF DESCRIPTION OF DRAWINGS

The present invention will be described hereafter with reference to the attached drawings which are given as non-limiting examples only, in which.

DETAILED DESCRIPTION OF THE DRAWINGS

Figure 1:
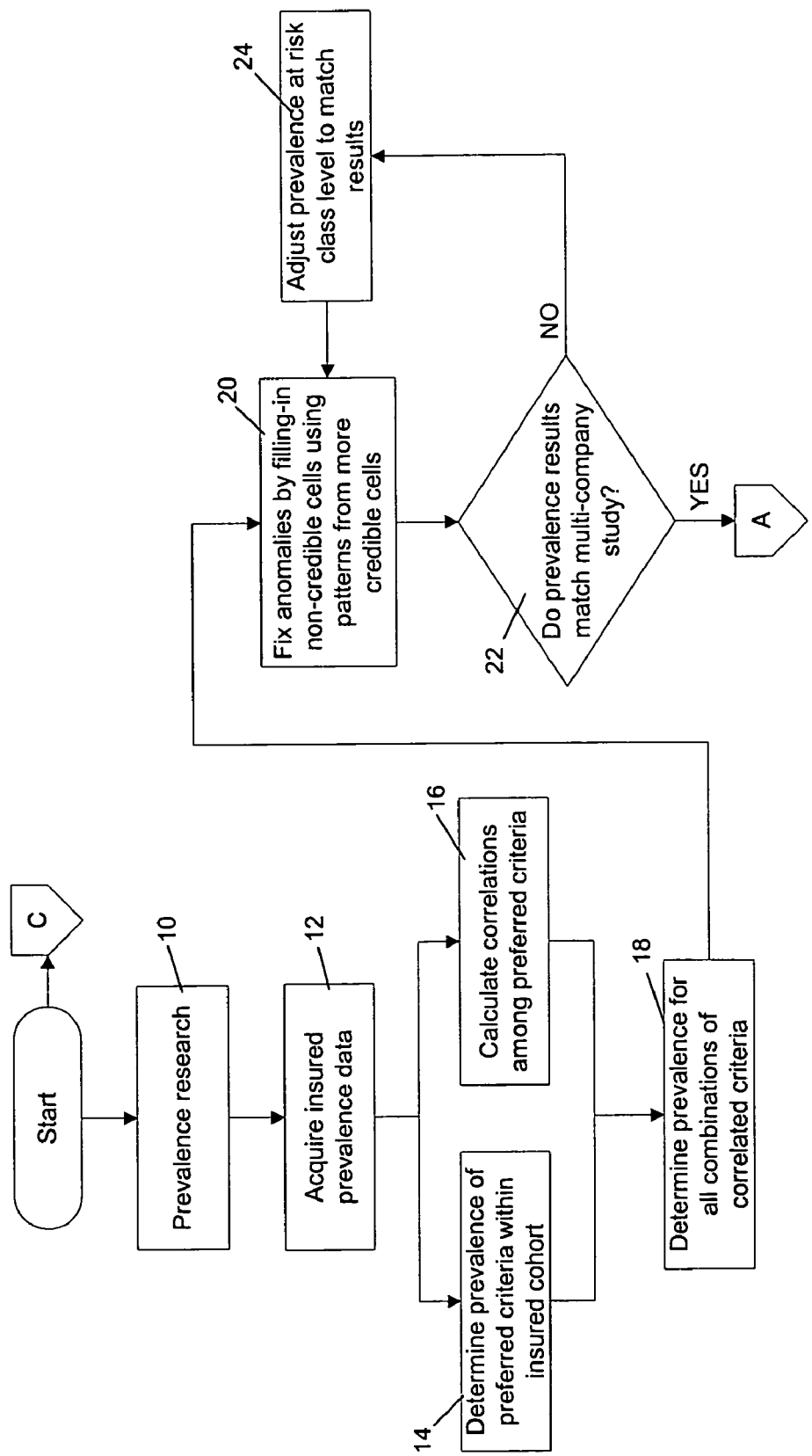
FIG. 1 is a flowchart which illustrates a portion of one embodiment of a method and system for characterizing relative risks.

FIG. 1 is a flowchart which illustrates a portion of one embodiment of a method/system for characterizing relative risks. In this example, the subject risks are mortality risks, and more specifically mortality risks which are based on a plurality of preferred risk criteria. The embodiment illustrated by this and the other figures can be used, for example, to compare and evaluate preferred risk classifications used by different insurance companies in connection with their respective products. In such an instance, different criteria are often used by one or more of the companies in determining which risks are deemed preferred. Use of the embodiment illustrated in the figures allows for comparison of preferred insurance products, notwithstanding the differences in the preferred criteria used by different companies. The system and method illustrated may also be used by an individual company in the design and/or pricing of a product, and in the evaluation of individual risk exceptions, as is described more fully below in connection with the figures.

With reference to FIG. 1, the first step illustrated by process block 10 relates to conducting or gathering prevalence research. "Prevalence" is the rate of occurrence of a criterion (or criteria) among an insured population. For example, if one of the preferred criterion is systolic blood pressure, information relating to the prevalence of systolic blood pressure levels, and to the levels used as "cut-points" or limits in classifying an individual risk as standard or preferred, is gathered and entered.

Block 12 illustrates the step of acquiring prevalence data relating to an insured population. For example, a large laboratory dataset of insured applicants can be studied to collect prevalence information related to systolic blood pressure.

The next "step" in the process is actually two steps illustrated by blocks 14 and 16. The operations represented by these blocks may be performed simultaneously, or in any desired order. Block 14 illustrates the step of determining the prevalence of preferred criteria within an insured cohort. A cohort is a risk classification which represents a range of incremental probabilities of occurrence of an insurable event. Accordingly, the operation illustrated by block 14 is a determination of the rate of occurrence of the subject criteria among the members of a particular risk classification.

The operation illustrated by block 16 relates to calculation of correlations which may exist among various ones of the preferred criteria. The term "correlations" is not used in the narrow mathematical sense of a particular second order moment of a probability distribution. Rather, this term is used in a sense intended to indicate the presence of, or a measure of, the dependence between two or more variables (in this case, two or more preferred criteria). In some instances, one or more criteria may be highly correlated with one another. In such instances, the impact of such criteria may be somewhat redundant. This type of correlation is discussed in additional detail in U.S. patent application Ser. No. 10/291,301 filed Nov. 8, 2002, which is commonly assigned to the assignee of the present application. To the extent necessary for a full understanding and appreciation of the present invention, the entirety of U.S. patent application Ser. No. 10/291,301 is hereby incorporated into this discussion by this reference thereto.

The next step, represented by block 18, is the determination of prevalence for all combinations of correlated criteria. In other words, a numerical representation of the prevalence within a population is determined for each unique combination of criteria.

With reference to the operation represented by block 20, if particular combinations of criteria result in non-credible or aberrant results, adjustments will be made. With further reference to U.S. patent application Ser. No. 10/291,301, it is explained that a probability of occurrence can be determined for each combination of criteria. These values can be arranged in the form of a matrix having dimensions equal to the number of preferred criteria being considered. Each location in the matrix is a "cell" containing a value specific to a particular combination of criteria. The operation represented by block 20 is provided in recognition of the fact that, in such a matrix, inconsistencies can result in the values generated for certain combinations. In that event, the value in the aberrant cell is replaced with a value that is consistent with the pattern established by adjacent, credible cells.

Figure 3:
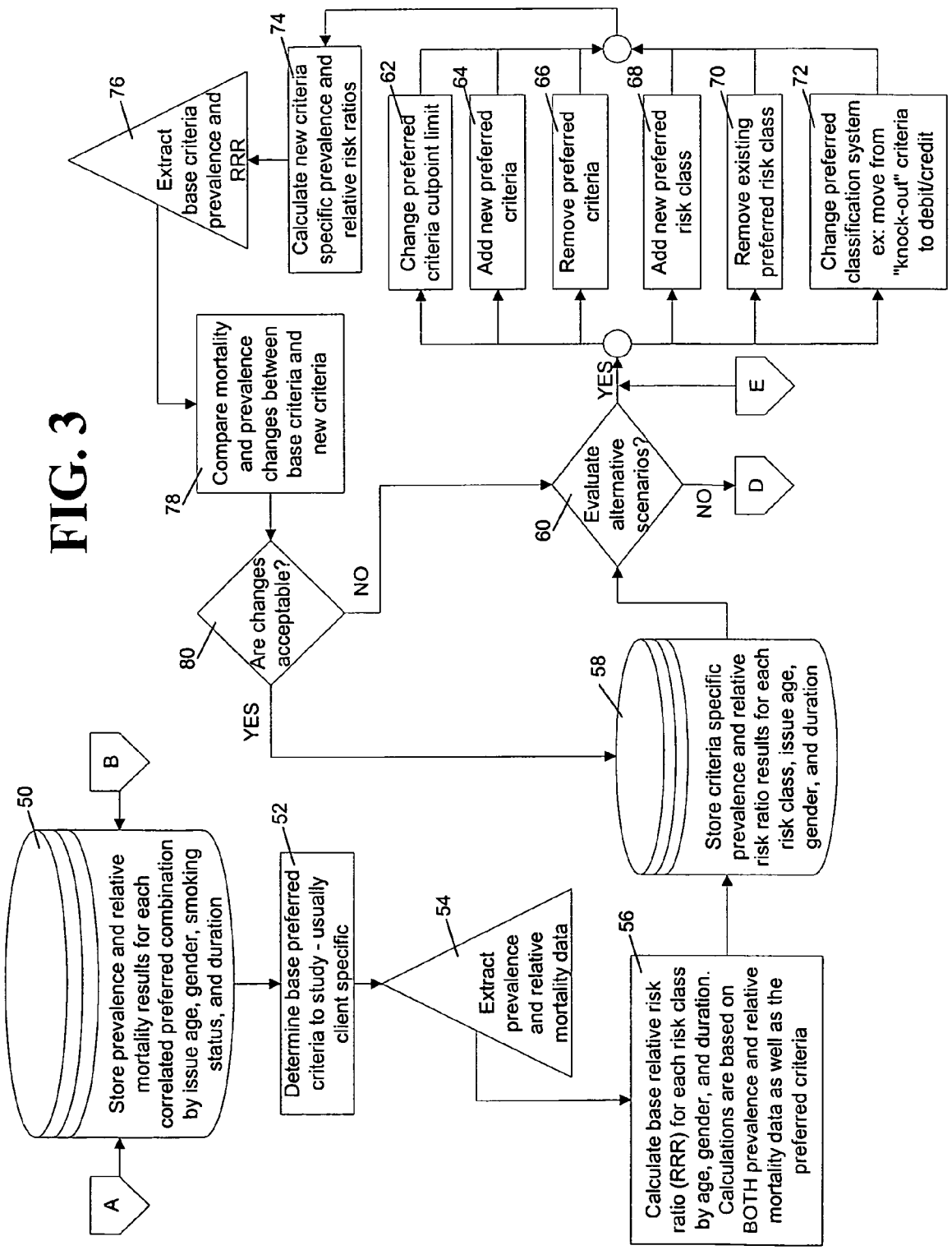
FIG. 3 is a continuation of the flowcharts of FIGS. 1 and 2.

The results of this determination are then compared to the empirical data available from multi-company studies. This operation is represented by decision block 22. If the prevalence of certain combinations vary with what has been observed in credible studies, adjustments are made to match the study results. This operation is represented by process block 24. If this adjustment process results in anomalies within the matrix, such anomalies are detected and corrected in the operation represented by block 20. When the prevalence results match the empirical evidence, the prevalence results are stored, as indicated by storage operation 50 (FIG. 3). As indicated, the prevalence results for each combination of preferred criteria are stored by issue age, gender, smoking status, and duration.

Figure 2:
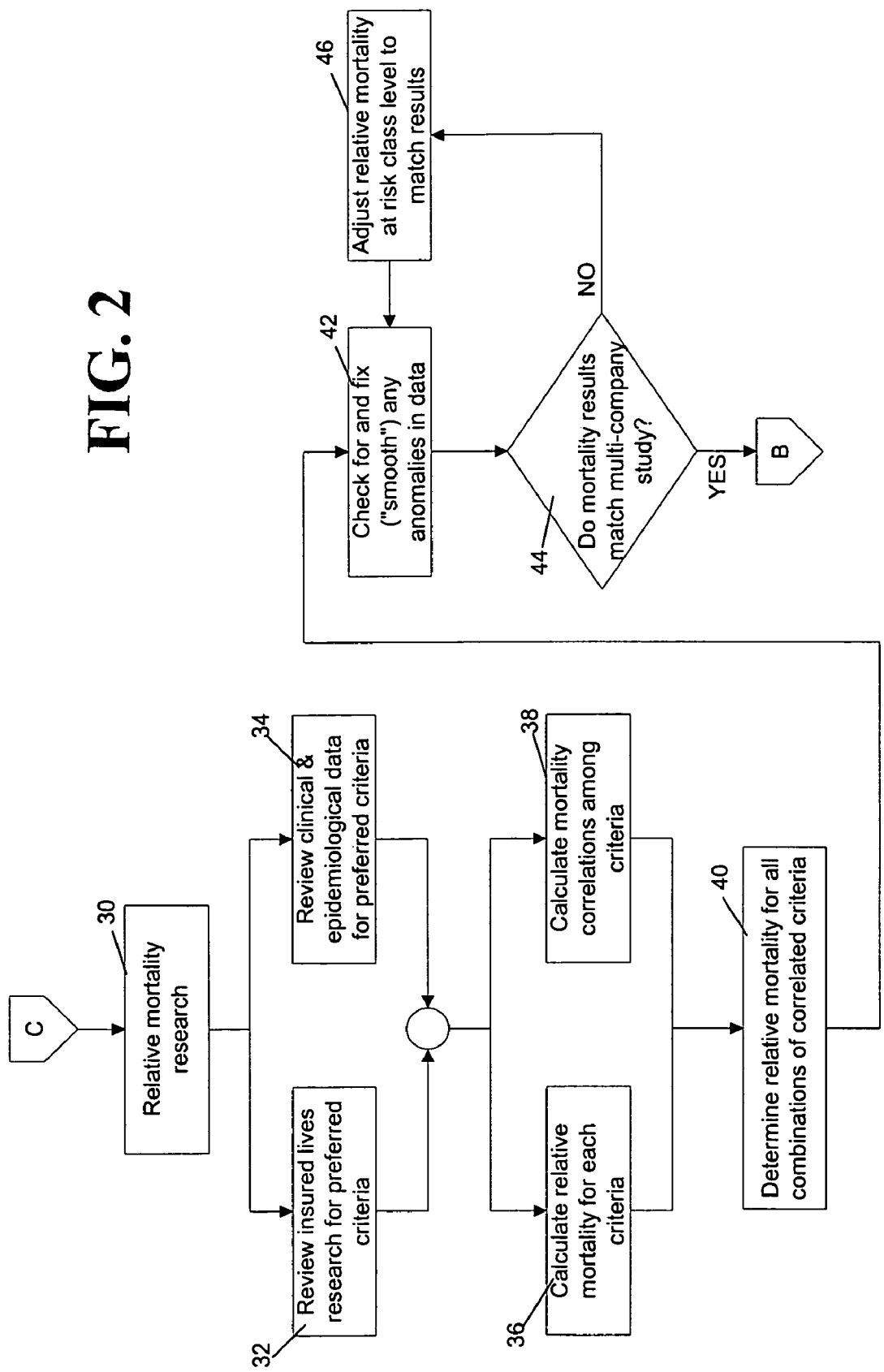
FIG. 2 is a continuation of the flowchart of FIG. 1.

FIG. 2 shows another portion of one embodiment of the subject process for characterizing risks. The portion of the process illustrated in FIG. 2 may be performed before, after, or contemporaneously with the portion of the process discussed in connection with FIG. 1. The portion of the process illustrated by FIG. 2 relates to relative mortality (i.e., rate of death among preferred classes divided by standard mortality). The first step illustrated by block 30 relates to conducting or gathering data from mortality research. This body of research includes information specific to each of the preferred criteria being considered. The review of this information is represented in FIG. 2 by block 32. In addition, other clinical/epidemiological data generally available in connection with the subject preferred criteria are reviewed (block 34).

Based on these reviews, a relative mortality rate for each of the criteria is calculated (block 36). As in the case with prevalence data, correlations in mortality data among the various criteria are also calculated (block 38). Finally, relative mortality rates are determined for all combinations of correlated criteria (block 40). Following these operations, any anomalies in the data are identified and resolved or "smoothed" (block 42). The relative mortality rates determined for the combinations are compared with data from multi-company studies to determine whether the rates match the empirical data. This operation is represented in FIG. 2 by decision block 44. To the extent that the determined rates do not match the empirical evidence, adjustments to the relative mortality rates are made to match the empirical results. This operation is represented by block 46. Following adjustments, the data are checked for anomalies and any that occur are corrected (block 42). When the relative mortality data is consistent with data from the multi-company studies, the data are stored as indicated by storage operation 50 of FIG. 3. As with the prevalence data, the relative mortality results are stored for each correlated, preferred combination by issue age, gender, smoking status and duration.

With further reference to FIG. 3, after storing the prevalence and relative mortality results for each correlated combination of preferred criteria (storage operation 50), the process proceeds as indicated in FIG. 3 by determining a specific base-preferred criteria set to study (block 52). Determination of the criteria in this step is usually client or company specific. That is, the criteria used by a particular company or insurance product to identify a preferred risk is determined, and the subject process is used to calculate a base relative risk ratio ("RRR") for this combination.

After determining the base criteria, prevalence and relative mortality data are extracted from storage for such criteria (block 54). After extraction of this data, an RRR for each risk class by age, gender and duration is calculated as indicated by block 56. A specific formula for calculating RRR is set forth in detail below. Calculations for each risk class are based on both prevalence and relative mortality data, as well as on the preferred criteria defining each risk class.

The results of the calculation illustrated by block 56 are stored as indicated by storage operation 58. The system then provides a user with the opportunity to evaluate alternative scenarios (decision block 60). Examples of alternative scenarios are illustrated by process blocks 62-72. These include changing preferred criteria cut-point limits (62), adding new criteria (64), removing criteria (66), adding one or more new preferred risk classes (68), removing one or more existing preferred risk classes (70), and changing the preferred classification system (72). If alternative scenarios are evaluated, new criteria specific prevalence and relative risk ratios are calculated (block 74). The base criteria prevalence and relative risk ratio results are extracted from the data previously stored (58), and the newly calculated prevalence and RRR results for the new criteria are compared to the results using the base criteria. These operations are represented in FIG. 3 by blocks 76 and 78. The process then determines whether the changes are acceptable (decision block 80). If so, the results for the new criteria are stored (58). If the results are not acceptable, changes can be made and additional scenarios reflecting such changes can be evaluated.

Figure 4:
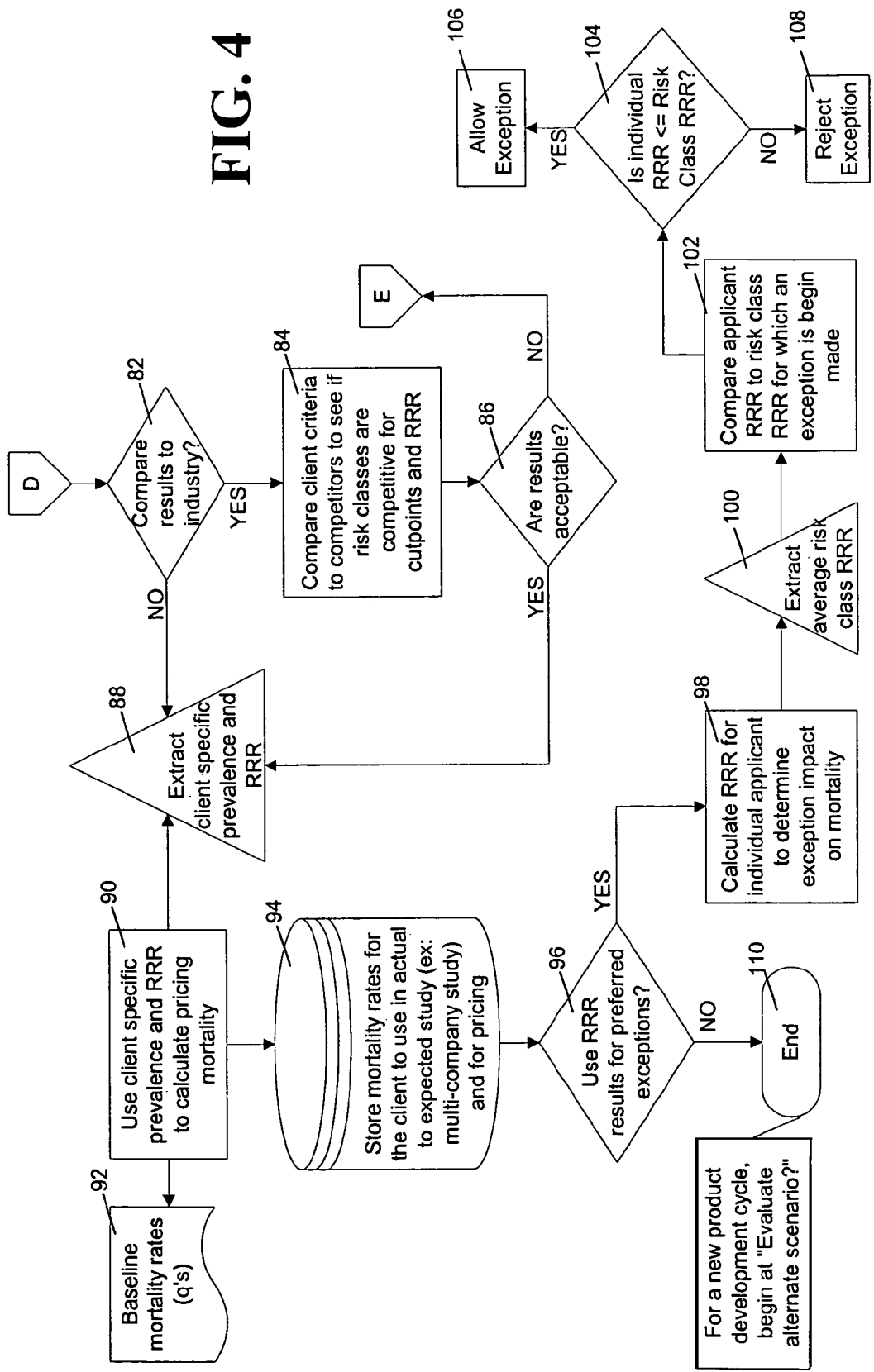
FIG. 4 is a continuation of the flowchart of FIG. 3.

After evaluation of all desired alternative scenarios, or if no alternative scenarios are to be evaluated, the process proceeds as illustrated in the flow chart of FIG. 4. The results stored in storage operation 58 may optionally be compared to known results available in the relevant industry or market. This option is represented in FIG. 4 by decision block 82. In one application, the results relating to criteria used by a client firm can be compared to those of the industry to evaluate the competitiveness of the client firm's risk classifications. This operation is represented in FIG. 4 by block 84. If the results of the comparison are acceptable, the process proceeds as indicated by the "yes" branch exiting decision block 86. If the results of the comparison are not acceptable (e.g., the compared criteria are not deemed competitive), the process allows for the evaluation of alternatives, as previously discussed.

If the results of the comparison are acceptable, or if no comparisons are made, the process proceeds as indicated at block 88. That is, client specific prevalence and RRR data are extracted from storage, and are used to calculate pricing mortality (block 90). Baseline mortality rates may be produced in the form of a document (92), and mortality rates are stored as indicated in storage operation 94. The stored mortality rates may be used in comparing the client's actual mortality experience against expected mortality experience and for the development of product pricing.

The RRR results may also be used for evaluating preferred exceptions, as indicated at decision block 96. If that is the case, an RRR is calculated for an individual applicant to determine the impact such exception would have on mortality of the risk class (block 98). The average RRR for the risk class is extracted (block 100) and compared to the RRR of the individual applicant (block 102). As indicated by decision block 104, if the individual RRR is less than or equal to the average RRR for the risk class, the exception may be allowed (block 106). If the individual RRR is greater than the average RRR for the risk class, the exception may be rejected (block 108).

Calculation of RRRs for an individual applicant can also be performed using subcategories of criteria (e.g., medical criteria, personal/family history criteria, violent deaths, etc.). Decisions to include individuals in, or exclude individuals from, a preferred class can be made based on one or more of the RRRs from the subcategories. This tool will allow an insurer to accept relatively good risks that might otherwise have been rejected due to a failure to meet a particular criteria, or to reject relatively bad risks which might otherwise be accepted (e.g., by an individual marginally qualified under many of the criteria). Use of this tool is not limited to any specific group or subcategory of criteria. In the life insurance context, such analyses can be made regarding criteria such as motor vehicle reports, participation in hazardous sports or activities, aviation activities, foreign travel, etc. Indeed, virtually any factor that affects the mortality risk of an individual, either positively or negatively, can be incorporated into this tool when evaluating the overall appropriateness of including that individual in a preferred risk classification.

In the event RRR results are not used to evaluate preferred exceptions, the process ends, as indicated by terminal block 110. It should be noted that a new product development cycle can begin for the same client at decision operation 60 as an evaluation of an alternative scenario. Barring substantial changes in data, there would be no reason to repeat the preceding steps and operations illustrated.

RRR Formula

The relative risk ratio for a particular preferred class reflects the mortality rate of that risk class relative to the overall average rate for the full distribution of risks classified as "standard lives" through the underwriting process. The RRR varies by gender, issue age, smoking status, preferred risk class and duration.

A particular risk class ($R^t$) can be defined by the following "n" criterion:

| Preferred Risk Factor | Global Min | Class Min | Class Max | Global Max |
| --- | --- | --- | --- | --- |
| Risk Criterion 1 | 1 | a | b | c |
| Risk Criterion 2 | 1 | d | e | f |
| . | | | | |
| . | | | | |
| . | | | | |
| Risk Criterion k | 1 | l | m | n |
| . | | | | |
| . | | | | |
| . | | | | |
| Risk Criterion n | 1 | x | y | z |

Let $M_{pq\ldots s\ldots t}$=The relative mortality rate for individuals who have a value of "p" for Risk Criterion 1, "q" for Risk Criterion 2, ..., "s" for Risk Criterion k, ..., and "t" for Risk Criterion n.

Let $P_{pq\ldots s\ldots t}$=The relative prevalence for individuals who have a value of "p" for Risk Criterion 1, "q" for Risk Criterion 2, ..., "s" for Risk Criterion k, ..., and "t" for Risk Criterion n.

Using a splinter type formula, the RRR can be expressed as the ratio of $R^t$ divided by $R$:

where:

for (p=a to b) (q=d to e) (s=l to m) (t=x to y)

$R^t = (\Sigma(M_{pq\ldots s\ldots t} * P_{pq\ldots s\ldots t}))$ divided by $\Sigma P_{pq\ldots s\ldots t}$ and for (p=1 to c) (q=1 to f) (s=1 to n) (t=1 to z)

$R = (\Sigma(M_{pq\ldots s\ldots t} * P_{pq\ldots s\ldots t}))$ divided by $\Sigma P_{pq\ldots s\ldots t}$ There is a relationship between the values in the incremental or splinter matrix described in U.S. patent application Ser. No. 10,291,301 and the RRR referred to above. Each of the values in the multi-dimensional splinter matrix could be defined as the RRR for a specific individual or individuals exactly meeting the criteria associated with that position the matrix. In the context of the present application (e.g., comparing one preferred product based on criteria set A with another preferred product based on criteria set B, the comparisons of RRRs are comparable to comparing one group of splinters to another group of splinters.

An example may help to illustrate this aspect. Consider nine individuals having different diastolic and systolic blood pressure readings, as indicated in Table 1. Assume that the splinter value (or individual RRR) associated with these readings is as listed in the right-most column of Table 1 (the numbers in the table are exaggerated for purposes of illustration):

| DBP | SBP | Splinter Mortality |
| --- | --- | --- |
| 70 | 130 | 85.0% |
| 71 | 130 | 95.0% |
| 72 | 130 | 110.0% |
| 70 | 131 | 86.0% |
| 71 | 131 | 96.0% |
| 72 | 131 | 111.0% |
| 70 | 132 | 87.0% |
| 71 | 132 | 97.0% |
| 72 | 132 | 112.0% |

The right-most column headed "Splinter Mortality" represents the mortality of an individual with the exact blood pressure readings listed in the center and left-most columns, relative to "standard" mortality (i.e., the average mortality for a healthy group of people). Thus, an individual having a 70 DBP and 130 SBP would have a mortality of 85% times standard mortality. Assume company A provides a preferred product having a criteria which includes a DBP of less than or equal to 70, and company B provides a preferred product having a criteria which includes an SBP of less than or equal to 130. From this universe of nine individuals, company A's RRR would be the combination of three splinters (130/70, 131/70 and 132/70) or 86% (i.e., (85+86+87)/3). Company B's RRR would also be the combination of three splinters (130/70, 130/71 and 130/72) or 96.7% (i.e., (85+95+110)/3). Although both companies have 33% of the entire group qualifying for their respective preferred products, company A could offer a better premium. In this example, company B may actually "lose" the individual with the 130/70 readings, as that individual could go to company A to receive the benefit of the lower premium. This would cause company B's mortality to increase further.

Given the wide spectrum of preferred criteria considered by various companies, and the relatively large numbers of criteria underlying individual products, such comparisons between competing companies and/or products would be difficult without a formal and computerized methodology. This simplified example was merely intended to illustrate the principle involved.

The method and system may be implemented using readily available computer technology, including input and output devices, a processor, and data storage units. The operation of the system is controlled by program code which implements the methodology illustrated by the enclosed flow charts. There is no requirement that the method and system comprise a single machine or that all components of the system be located in the same physical location. Alternatively, the method and system may be realized as a special purpose device or machine designed specifically for implementing the subject invention.

Although the invention has been described with reference to particular means and embodiments, one skilled in the art can ascertain the essential characteristics of the invention. Various changes and modifications may be made to adapt the invention to various uses and environments without departing from the spirit and scope of the invention, as set forth in the following claims.

What is claimed is:

1. A method of characterizing relative risks associated with a plurality of financial products performed on a computer having a hardware processor, comprising the steps of:
   identifying one or more risk classes associated with the plurality of financial products by using an input device of the computer;
   storing data in a data storage of said computer relating to prevalence of criteria associated with said risk classes;
   determining, for each of the risk classes, an expected occurrence rate by the processor;
   dividing the expected occurrence rates determined by said step of determining by an average rate by the processor and determining a relative risk ratio for each of the risk classes based on the expected occurrence rates and based on the prevalence of the criteria associated with the risk classes;
   calculating correlated risk ratios between at least two of the risk classes that are identified in said step of identifying and determining a dependence between the at least two different risk classes based on the correlated risk ratios;
   comparing the relative risk ratios and the correlated risk ratios by the processor with empirical data and generating comparative risk data to characterize the relative risks associated with the plurality of products based on the relative risk ratios and the correlated risk ratios;
   correcting the relative risk ratios in a case the comparative risk data is out of a defined range comparing with the empirical data; and
   storing the corrected risk ratios to a storage unit of the computer.

2. The method of claim 1, wherein said one or more risk classes are associated with one or more criteria, and further comprising the step of:
   modifying one or more of said criteria and repeating said steps of determining, dividing, calculating and comparing and determining an impact of said modification on the relative risks associated with the products.

3. The method of claim 1,
   wherein one or more of said risk classes are associated with different criteria, and wherein said relative risk ratios are used to compare said risk classes.

4. The method of claim 1, further comprising the step of:
   using the relative risk ratio for redefining one or more of said risk classes.

5. The method of claim 1, further comprising the step of:
   determining a separate relative risk ratio for sub-groups of risks.

6. The method of claim 1, further comprising the step of:
   comparing the prevalence data to industry empirical data for particular combinations of criteria; and
   adjusting the stored data to agree with the empirical data.

7. The method of claim 1, further comprising the step of:
   storing data relating to the expected occurrence rates; and
   determining the relative risk ratios based on the expected occurrence rates.

8. The method of claim 7, further comprising the step of:
   adjusting the corrected risk ratios to agree with the empirical data.

9. The method of claim 2, further comprising the step of:
   using the relative risk ratio to determine an impact on a risk class of including in that class one or more risks that do not meet one or more of the criteria associated with that class.

10. A system for characterizing relative risks associated with a plurality of financial products, comprising:
    an input device;
    a hardware processor that identifies one or more risk classes associated with the plurality of financial products;
    stores data relating to prevalence of criteria associated with said risk classes;
    determines, for each of the risk classes, an expected occurrence rate;
    divides the expected occurrence rates by an average rate and determining a relative risk ratio for each of the risk classes based on the data relating to prevalence of the criteria associated with said risk classes;
    calculates correlated risk ratios between at least two of the risk classes that are identified in said step of identifying and determining a dependence between the at least two different risk classes;
    compares the relative risk ratios and the correlated risk ratios with empirical data and generating comparative risk data to characterize the relative risks associated with the plurality of products;
    corrects the relative risk ratios in a case the comparative risk data is out of a defined range comparing with the empirical data; and
    an output device for outputting the corrected risk ratios.

11. The system of claim 10, wherein said one or more risk classes are associated with one or more criteria, and said hardware processor further modifies one or more of said criteria and re-determining the relative risk ratio and for determining an impact of said modification on the relative risks associated with the products.

12. The system of claim 10, wherein one or more of said risk classes are associated with different criteria, and said hardware processor further compares the risk classes based on said relative risk ratios.

13. The system of claim 10, the hardware processor further redefines one or more of said risk classes based on the relative risk ratio.

14. The system of claim 10, the hardware processor further determines a separate relative risk ratio for sub-groups of risks.

15. The system of claim 10, the hardware processor further compares the prevalence data to industry empirical data for particular combinations of criteria; and adjusts the stored data to agree with the empirical data.

16. The system of claim 10, the hardware processor further stores data relating to the expected occurrence rates, wherein in said dividing the relative risk ratio based on the data relating to the expected occurrence rates is determined.

17. The system of claim 16, the hardware processor further adjusts the corrected risk ratios such that the corrected risk ratios agree with the empirical data.

18. The system of claim 10, wherein said one or more risk classes are associated with one or more criteria, the hardware processor further determines an impact on a risk class of including in that class one or more risks that do not meet one or more of the criteria based on the relative risk ratios.

19. The method of characterizing relative risks according to claim 3, wherein the different criteria used for the risk classes are diastolic blood pressure and systolic blood pressure.

20. The system according to claim 12, wherein the different criteria used for the risk classes are diastolic blood pressure and systolic blood pressure.

* * * * *